Patented Jan. 15, 1929.

1,698,878

UNITED STATES PATENT OFFICE.

MARY RAY CONE, OF SUDBROOK PARK, MARYLAND, ASSIGNOR, BY MESNE ASSIGNMENTS, TO THE UNION TRUST COMPANY, OF CLEVELAND, OHIO, A CORPORATION OF OHIO.

BITUMINOUS PRODUCT.

No Drawing. Application filed October 24, 1921. Serial No. 510,130.

This invention relates to a bituminous composition for example, asphalt, pitch, hydrocarbon residues or mixtures thereof, which can be maintained indefinitely in a condition miscible in water to form a paste or cement of varying consistency depending on the amount of water that may be added thereto and forming a product which can be used for many purposes.

As an example of its numerous uses my improved product may be employed as a base for a bituminous paint, that is capable of being spread in a relatively thin and semi-liquid condition over the surface to be covered and which when dry will form a uniform, homogeneous and coherent layer impervious to moisture and also possessing relatively high fire-resisting properties. The product may also be used as a surfacing material for roadways either with or without admixture of mineral aggregates and may be spread to the desired thickness in a plastic form, so it can be easily and quickly graded to any desired tangent or radius and will set quickly to form a dense and hard yet elastic and durable road surface possessing substantially all the inherent properties and qualities of an asphalt or bituminous surface.

The invention also consists in forming a product having the novel characteristics, the new and useful applications and the several original features of utility hereinafter set forth and claimed.

The product consists essentially in an extremely minute sub-division of bituminous matter partially dispersed in a condition closely approximating a colloid state, and then treated to produce a plastic, semi-liquid or flocculent mass that is readily miscible in water without the addition of heat or any reagent and without requiring any special treatment or manipulation.

The individual minute particles forming the mass are of uniform consistency and maintain their distinct and separate identities by reason of the dispersion medium such as water which may surround each of the particles or by the film of liquid which is adsorbed on the surface of each particle as long as the mass is kept in a moist condition. When the mass is spread out in a layer or coating, however, the moisture evaporates and thereupon the particles coalesce to form a continuous, coherent and homogeneous layer possessing substantially all of the properties and characteristics of the original bituminous substance forming a close, compact, coherent body or layer particularly adapted to form a surface coating especially for roadways and places where resisting qualities are required.

The product is preferably prepared by finely dividing the bituminous material in any suitable manner as by atomizing or spraying. To provide an extremely fine state of sub-division, the particles are brought into contact with a moving body of fluid such as a current of air or a body of water at a relatively high temperature but below the fusing point of the material and which has a progressively increasing velocity, so that contact will be prevented between the individual particles for a period of time sufficient to permit the same to set. These particles are then immersed in a heated liquid which is allowed slowly to cool and the excess liquid to form a supernatant layer which may be removed by decanting or in any other suitable manner.

The mass which remains after removing the supernatant liquid has the appearance of a semi-liquid, finely grained, somewhat oleaginous paste in which the larger particles are barely visible to the naked eye. The water forming the dispersion medium for the finely divided bituminous substance which contains particles approaching the colloidal state of fineness is deeply colored as a result of the dispersed particles in suspension. This paste is very stable in character and will maintain its characteristics indefinitely unless the moisture is removed from the mass by distillation, evaporation or in some similar manner, when the particles will coalese to form a homogeneous body of the bituminous material similar in practically all respects as to chemical analysis and physical characteristics to the original substance prior to treatment.

Although I have set forth and described one process for producing my improved production, it is obvious that various changes may be made in the process or the separate steps thereof without modifying or changing the essential features and characteristics of the product produced and that such product remains substantially the same, although slight modifications may be made in its appearance, texture and in its physical and chemical characteristics.

Having thus described my invention, I claim:

A bituminous composition comprising essentially finely divided particles of bitumen isolated from each other by films of water, said water being ordinarily immiscible therewith, a substantial part of said particles being of colloidal fineness, the larger particles of said bituminous material being barely distinguishable as such by the naked eye and said composition being mobile and miscible with water in all proportions during the retention of said films and forming a coherent, continuous mass of bitumen not miscible with water upon removal of the films therefrom.

Signed at Pikesville in the county of Baltimore and State of Maryland this 12th day of October, A. D. 1921.

MARK RAY CONE.